(12) United States Patent
Daniel et al.

(10) Patent No.: US 11,341,237 B2
(45) Date of Patent: May 24, 2022

(54) ANOMALY DETECTION FOR COMPUTER SYSTEMS

(71) Applicant: British Telecommunications Public Limited Company, London (GB)

(72) Inventors: Joshua Daniel, London (GB); Xiaofeng Du, London (GB)

(73) Assignee: British Telecommunications Public Limited Company, London (GB)

( * ) Notice: Subject to any disclaimer, the term of this patent is extended or adjusted under 35 U.S.C. 154(b) by 232 days.

(21) Appl. No.: 16/498,932

(22) PCT Filed: Mar. 26, 2018

(86) PCT No.: PCT/EP2018/057685
§ 371 (c)(1),
(2) Date: Sep. 27, 2019

(87) PCT Pub. No.: WO2018/178034
PCT Pub. Date: Oct. 4, 2018

(65) Prior Publication Data
US 2021/0089650 A1    Mar. 25, 2021

(30) Foreign Application Priority Data
Mar. 30, 2017   (EP) .................................. 17164005

(51) Int. Cl.
*G06F 21/00*   (2013.01)
*G06F 21/55*   (2013.01)
(Continued)

(52) U.S. Cl.
CPC ............ *G06F 21/554* (2013.01); *G06F 21/51* (2013.01); *G06F 21/552* (2013.01); *H04L 63/20* (2013.01)

(58) Field of Classification Search
CPC ...... G06F 21/554; G06F 21/51; G06F 21/552; H04L 63/20
See application file for complete search history.

(56) References Cited

U.S. PATENT DOCUMENTS

| | | | |
|---|---|---|---|
| 6,192,405 B1 | 2/2001 | Bunnell | |
| 6,535,493 B1 | 3/2003 | Lee et al. | |

(Continued)

FOREIGN PATENT DOCUMENTS

| | | | |
|---|---|---|---|
| EP | 1919123 A1 | 5/2008 | |
| EP | 2381363 A2 | 10/2011 | |

(Continued)

OTHER PUBLICATIONS

"A Next-Generation Smart Contract and Decentralized Application Platform," Ethereum White Paper, 2016, retrieved from https://github.com/ethereum/wiki/wiki/White-Paper on Nov. 13, 2018, 40 pages.

(Continued)

*Primary Examiner* — Ghazal B Shehni
(74) *Attorney, Agent, or Firm* — Patterson Thuente IP

(57) ABSTRACT

A computer implemented method to detect a computer system in execution operating in a manner that is not compliant with a definition of a set of compliant operations, the method including receiving a first set of records for the computer system, each record detailing an occurrence in the computer system during a first predetermined time period; generating a sparse distributed representation of the set of records to form a training set for a hierarchical temporal memory (HTM); training the HTM based on the training set in order that the trained HTM provides a model of the operation of the computer system during the predetermined time period; selecting at least a subset of operations in the set of compliant operations and causing the invocation of each operation of the subset in the computer system over a second (Continued)

predetermined time period to generate a second set of records of occurrences in the computer system; generating a sparse distributed representation of the set of records to form an input set for the trained HTM; executing the trained HTM based on the input set to determine a degree of recognition of the records of the input set; and responsive to a determination that a degree of recognition of one or more records of the input set is below a threshold degree, identifying the operation of the computer system as non-compliant.

5 Claims, 3 Drawing Sheets

(51) Int. Cl.
*G06F 21/51* (2013.01)
*H04L 29/06* (2006.01)

(56) References Cited

U.S. PATENT DOCUMENTS

| | | |
|---|---|---|
| 7,181,768 B1 | 2/2007 | Ghosh et al. |
| 7,716,739 B1 | 5/2010 | McCorkendale |
| 7,797,748 B2 | 9/2010 | Zheng et al. |
| 7,870,153 B2 | 1/2011 | Croft et al. |
| 8,271,974 B2 | 9/2012 | Mazhar et al. |
| 8,375,437 B2 | 2/2013 | Linsley et al. |
| 8,479,294 B1 | 7/2013 | Li et al. |
| 8,516,241 B2 | 8/2013 | Chang et al. |
| 8,590,057 B1 | 11/2013 | Mayblum et al. |
| 8,661,254 B1 | 2/2014 | Sama |
| 8,739,155 B2 | 5/2014 | Hehir et al. |
| 9,009,825 B1 | 4/2015 | Chang et al. |
| 9,183,378 B2 | 11/2015 | Banerjee et al. |
| 9,235,813 B1 | 1/2016 | Qian et al. |
| 9,466,051 B1 | 10/2016 | Roth et al. |
| 9,495,668 B1 | 11/2016 | Juels |
| 9,807,106 B2 | 10/2017 | Daniel et al. |
| 10,534,913 B2 | 1/2020 | Daniel et al. |
| 2002/0100035 A1 | 7/2002 | Kenyon et al. |
| 2002/0120725 A1 | 8/2002 | DaCosta et al. |
| 2003/0084349 A1 | 5/2003 | Friedrichs et al. |
| 2003/0204644 A1 | 10/2003 | Vincent |
| 2004/0015977 A1 | 1/2004 | Benke et al. |
| 2004/0213260 A1 | 10/2004 | Leung et al. |
| 2004/0268296 A1 | 12/2004 | Kayam et al. |
| 2005/0091269 A1 | 4/2005 | Gerber et al. |
| 2006/0282660 A1 | 12/2006 | Varghese et al. |
| 2007/0028220 A1* | 2/2007 | Miller .................. G06K 9/6251 717/124 |
| 2007/0192267 A1 | 8/2007 | Hawkins et al. |
| 2009/0254499 A1 | 10/2009 | Deyo |
| 2009/0313193 A1 | 12/2009 | Hawkins et al. |
| 2010/0011029 A1 | 1/2010 | Niemela |
| 2010/0262873 A1 | 10/2010 | Chang et al. |
| 2011/0197070 A1 | 8/2011 | Mizrah |
| 2011/0265154 A1 | 10/2011 | Furlan et al. |
| 2012/0044862 A1 | 2/2012 | Chen et al. |
| 2012/0053925 A1 | 3/2012 | Geffin et al. |
| 2012/0215727 A1 | 8/2012 | Malik et al. |
| 2012/0246290 A1 | 9/2012 | Kagan |
| 2012/0284794 A1 | 11/2012 | Trent et al. |
| 2012/0304007 A1 | 11/2012 | Hanks et al. |
| 2012/0311526 A1 | 12/2012 | Deanna et al. |
| 2013/0006949 A1 | 1/2013 | Essawi et al. |
| 2013/0044733 A1 | 2/2013 | Jang |
| 2014/0067734 A1 | 3/2014 | Hawkins et al. |
| 2014/0164251 A1 | 6/2014 | Loh |
| 2014/0180738 A1 | 6/2014 | Phillipps et al. |
| 2014/0215490 A1 | 7/2014 | Mathur et al. |
| 2014/0298011 A1 | 10/2014 | Ganesan |
| 2014/0344015 A1 | 11/2014 | Puertolas-Montanes et al. |
| 2014/0355564 A1 | 12/2014 | Cherian et al. |
| 2014/0358825 A1 | 12/2014 | Phillipps et al. |
| 2014/0372346 A1 | 12/2014 | Phillipps et al. |
| 2014/0380444 A1 | 12/2014 | Kelley |
| 2015/0040195 A1 | 2/2015 | Park et al. |
| 2015/0082372 A1 | 3/2015 | Kottahachchi et al. |
| 2015/0120567 A1 | 4/2015 | Van Rooyen et al. |
| 2015/0127595 A1 | 5/2015 | Hawkins, II et al. |
| 2015/0134606 A1 | 5/2015 | Magdon-Ismail et al. |
| 2015/0181424 A1 | 6/2015 | Hardy |
| 2015/0227741 A1 | 8/2015 | Permeh et al. |
| 2015/0271318 A1 | 9/2015 | Antos et al. |
| 2015/0332283 A1 | 11/2015 | Witchey |
| 2015/0332395 A1 | 11/2015 | Walker et al. |
| 2015/0356523 A1 | 12/2015 | Madden |
| 2015/0356555 A1 | 12/2015 | Pennanen |
| 2015/0363876 A1 | 12/2015 | Ronca et al. |
| 2015/0373029 A1 | 12/2015 | Evenden et al. |
| 2015/0379423 A1 | 12/2015 | Dirac et al. |
| 2016/0048771 A1 | 2/2016 | Chen et al. |
| 2016/0057041 A1 | 2/2016 | Gupta et al. |
| 2016/0078367 A1 | 3/2016 | Adjaoute |
| 2016/0086175 A1 | 3/2016 | Finlow-Bates et al. |
| 2016/0098730 A1 | 4/2016 | Feeney |
| 2016/0112397 A1 | 4/2016 | Mankovskii |
| 2016/0142911 A1 | 5/2016 | Kreiner et al. |
| 2016/0162802 A1* | 6/2016 | Chickering ............ G06N 20/00 706/12 |
| 2016/0164884 A1 | 6/2016 | Sriram et al. |
| 2016/0221186 A1 | 8/2016 | Perrone |
| 2016/0260095 A1 | 9/2016 | Ford |
| 2016/0261690 A1 | 9/2016 | Ford |
| 2016/0283920 A1 | 9/2016 | Fisher et al. |
| 2016/0299938 A1 | 10/2016 | Malhotra et al. |
| 2016/0350173 A1 | 12/2016 | Ahad |
| 2016/0357966 A1 | 12/2016 | Porat et al. |
| 2016/0364787 A1 | 12/2016 | Walker et al. |
| 2017/0063886 A1 | 3/2017 | Muddu et al. |
| 2017/0063900 A1* | 3/2017 | Muddu .................. H04L 63/06 |
| 2017/0109735 A1 | 4/2017 | Sheng et al. |
| 2017/0124534 A1 | 5/2017 | Savolainen |
| 2017/0132630 A1 | 5/2017 | Castinado et al. |
| 2017/0134412 A1 | 5/2017 | Cheng et al. |
| 2017/0279774 A1 | 9/2017 | Booz et al. |
| 2017/0279818 A1 | 9/2017 | Milazzo et al. |
| 2017/0286136 A1 | 10/2017 | Dimitrakos et al. |
| 2018/0025166 A1 | 1/2018 | Daniel et al. |
| 2018/0144114 A1 | 5/2018 | Fiske |
| 2018/0165757 A1* | 6/2018 | Gelber .................. G06Q 30/08 |
| 2018/0225466 A1 | 8/2018 | Ducatel et al. |
| 2018/0225469 A1 | 8/2018 | Daniel et al. |
| 2018/0225611 A1 | 8/2018 | Daniel et al. |
| 2018/0232526 A1 | 8/2018 | Reid et al. |
| 2018/0285585 A1 | 10/2018 | Daniel et al. |
| 2019/0036895 A1 | 1/2019 | Irvine |
| 2019/0050541 A1 | 2/2019 | Wright et al. |
| 2019/0139136 A1 | 5/2019 | Molinari et al. |

FOREIGN PATENT DOCUMENTS

| | | |
|---|---|---|
| EP | 2101599 B1 | 9/2013 |
| EP | 2816469 A1 | 12/2014 |
| EP | 3101599 A2 | 12/2016 |
| GB | 2540976 A | 2/2017 |
| GB | 2540977 A | 2/2017 |
| WO | WO-0184285 A2 | 11/2001 |
| WO | WO-2012117253 A1 | 9/2012 |
| WO | WO-2013172750 A1 | 11/2013 |
| WO | WO-2015128612 A1 | 9/2015 |
| WO | WO-2015179020 A2 | 11/2015 |
| WO | WO-2016034496 A1 | 3/2016 |
| WO | WO-2016077127 A1 | 5/2016 |
| WO | WO-2016128491 A1 | 8/2016 |
| WO | WO-2016191639 A1 | 12/2016 |
| WO | WO-2017021154 A1 | 2/2017 |
| WO | WO-2017021155 A1 | 2/2017 |
| WO | WO-2017021153 A1 | 2/2017 |
| WO | WO-2017054985 A1 | 4/2017 |
| WO | WO-2017167547 A1 | 10/2017 |
| WO | WO-2017167548 A1 | 10/2017 |
| WO | WO-2017167549 A1 | 10/2017 |

(56) References Cited

FOREIGN PATENT DOCUMENTS

| | | |
|---|---|---|
| WO | WO-2017167550 A1 | 10/2017 |
| WO | WO-2017184160 A1 | 10/2017 |
| WO | WO-2018178026 A1 | 10/2018 |
| WO | WO-2018178034 A1 | 10/2018 |
| WO | WO-2018178035 A1 | 10/2018 |
| WO | WO-2018206374 A1 | 11/2018 |
| WO | WO-2018206405 A1 | 11/2018 |
| WO | WO-2018206406 A1 | 11/2018 |
| WO | WO-2018206407 A1 | 11/2018 |
| WO | WO-2018206408 A1 | 11/2018 |
| WO | WO-2018228950 A1 | 12/2018 |
| WO | WO-2018228951 A1 | 12/2018 |
| WO | WO-2018228952 A1 | 12/2018 |
| WO | WO-2018228973 A1 | 12/2018 |
| WO | WO-2018228974 A1 | 12/2018 |

OTHER PUBLICATIONS

Adler M., "Threat Intelligence Visibility—the way forward," BT, 2015, available from www.globalservices.bt.com/uk/en/products/assure threat_ monitoring, 8 pages.
Ahmad S., et al., "How do Neurons Operate on Sparse Distributed Representations? A Mathematical Theory of Sparsity, Neurons and Active Dendrites," Retrieved from https://arxiv.org/ftp/arxiv/papers/1601/1601.00720.pdf, 2018, 23 pages.
Ahmad S., et al., "Properties of Sparse Distributed Representations and their Application to Hierarchical Temporal Memory," retrieved from https://arxiv.org/ftp/arxiv/papers/1503/1503.07469.pdf on Mar. 28, 2018, Numenta, Mar. 24, 2015, 18 pages.
Ahmad S., et al., "Real-Time Anomaly Detection for Streaming Analytics," retrieved from https://arxiv.org/pdf/1607.02480.pdf on Mar. 28, 2018, Numenta, Inc., Jul. 8, 2016, 10 pages.
Aloul F., et al., "Two Factor Authentication Using Mobile Phones," May 2009, 5 pages.
Anonymous, "Can BitCoin be a better DRM? BitcoinBeginners," retrieved from https://www.reddit.com/r/BitcoinBeginners/comments/1y5yh8/can_bitcoin_be_a_better_drm/, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.
Antonopoulos A.M., "Mastering Bitcoin, Unlocking Digital Crypto-Currencies," O'Reilly Media, Apr. 2014, 282 pages.
Application and File History for U.S. Appl. No. 16/498,827, filed Sep. 27, 2019, Inventor(s): Daniel et al.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
Assia Y., et al., "Colored Coins Whitepaper," 2015, available at https://docs.google.com/document/d/1AnkP_cVZTCMLIzw4DvsW6M8Q2JC0llzrTLuoWu2z1BE/, 23 pages.
Azaria A., et al., "Medrec: Using Blockchain for Medical Data Access and Permission Management," In 2016 2nd International Conference on Open and Big Data (OBD), Aug. 2016, pp. 25-30.
Bakshi, et al., "Securing Cloud from DDOS Attacks Using Intrusion Detection System in Virtual Machine," IEEE, 2010, 5 pages.
Bellifemine, et al., "JADE: A Software Framework for Developing Multi-Agent Applications. Lessons Learned," Elsevier, 2007, 12 pages.
Benders J.F., "Partitioning Procedures for Solving Mixed Variables Programming Problems," 1962, vol. 4, pp. 238-252.
Billaudelle S., et al., "Porting HTM Models to the Heidelberg Neuromorphic Computing Platform," Feb. 9, 2016, Cornell University Library, retrieved from https://arxiv.org/pdf/1505.02142.pdf, 9 pages.
Biryukov A., et al., "R&D in Smart Contracts, Cryptocurrency, and Blockchain," University of Luxembourg, Jan. 19, 2016, 51 pages.
Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Combined Search and Examination Report under Sections 17 and 18(3) dated Nov. 7, 2017 for Great Britain Application No. 1709272.7, 8 pages.
Combined Search and Examination Report for Great Britain Application No. 1707379.2, dated Nov. 9, 2017, 9 pages.
Combined Search and Examination Report for Great Britain Application No. 1707377.6, dated Nov. 9, 2017, 9 pages.
Combined Search and Examination Report for Great Britain Application No. 1705137.6, dated Sep. 18, 2017, 5 pages.
Combined Search and Examination Report under sections 17 & 18(3) for Great Britain Application No. 1709273.5, dated Nov. 7, 2017, 8 pages.
Combined Search and Examination Report under sections 17 & 18(3) for Great Britain Application No. 1709274.3, dated Oct. 31, 2017, 8 pages.
Combined Search and Examination Report under Sections 17 and 18(3) for Great Britain Application No. 1705135.0, dated Sep. 26, 2017, 7 pages.
Combined Search and Examination Report under Sections 17 and 18(3) for Great Britain Application No. 1705174.9, dated Jul. 14, 2017, 5 pages.
Combined search and Examination Report under Sections 17 and 18(3) for Great Britain Application No. 1707376.8, dated Nov. 9, 2017, 8 pages.
Combined search and Examination Report under Sections 17 and 18(3) for Great Britain Application No. 1707378.4, dated Nov. 9, 2017, 11 pages.
Combined Search and Examination Report under Sections 17 and 18(3) for Great Britain Application No. 1709275.0, dated Dec. 1, 2017, 5 pages.
Combined Search and Examination Report under Sections 17 and 18(3) for Great Britain Application No. 1809489.6, dated Dec. 10, 2018, 8 pages.
Communication pursuant to Article 94(3) EPC for Application No. 18711986.2, dated Oct. 21, 2020, 11 pages.
Communication pursuant to Article 94(3) EPC for Application No. 18728662.0, dated Jan. 26, 2021, 6 pages.
Communication pursuant to Article 94(3) EPC for Application No. 18711988.8, dated Oct. 22, 2020, 11 pages.
Communication pursuant to Article 94(3) EPC For European Application No. 18728663.8, dated Jan. 26, 2021, 7 pages.
Cruz J.P., et al., "The Bitcoin Network as Platform forTransOrganizational Attribute Authentication," WEB 2015, The Third International Conference on Building and Exploring Web Based Environments, XP055239598, Rome, Italy, 2015, 7 pages.
Cui Y., et al., "Continuous Online Sequence Learning with an Unsupervised Neural Network Model," Neural Computation, vol. 28, No. 11, Nov. 2016, pp. 2474-2504.
Cui Y., et al., "The HTM Spatial Pooler: A Neocortical Algorithm for Online Sparse Distributed Coding," retrieved from https://www.biorxiv.org/content/biorxiv/early/2017/02/16/085035.full.pdf on Mar. 28, 2018, Numenta Inc., Feb. 3, 2017, 16 pages.
Czepluch J.S., et al., "The Use of Block Chain Technology in Different Application Domains," XP055242451, retrieved from http://http://www.lollike.org/bachelor.pdf, May 20, 2015, 109 pages.
Deloitte, "Blockchain @ Telco How Blockchain Can Impact the Telecommunications Industry and its Relevance to the C-Suite Introduction to Blockchain," Nov. 28, 2016, retrieved from https://www2.deloitte.com/content/dam/Deloitte/za/Documents/technology-media-telecommunications/za_TMT_Blockchain_TelCo.pdf on Jul. 27, 2017,pp. 9-20.
Dorri A., et al., "Blockchain for IoT Security and Privacy: The Case Study of a Smart Home," 2nd IEEE PERCOM Workshops, 2017, 7 pages.

(56) References Cited

OTHER PUBLICATIONS

Es-Samaali H., et al., "Blockchain-Based Access Control for Big Data," International Journal of Computer Networks and Communications Security, vol. 5 (7), Jul. 2017, pp. 137-147.
European Search Report for Application No. EP17164006.3, dated Jun. 29, 2017, 6 pages.
Examination Report under Section 18(3) for Great Britain Application No. 1709275.0, dated Jul. 8, 2020, 5 pages.
Extended European Search Report for Application No. 17170020.6, dated Nov. 10, 2017, 8 pages.
Extended European Search Report for Application No. 17170022.2, dated Nov. 16, 2017, 8 pages.
Extended European Search Report for Application No. 17170024.8, dated Nov. 10, 2017, 10 pages.
Extended European Search Report for Application No. 17175391.6, dated Nov. 14, 2017, 8 pages.
Extended European Search Report for Application No. 17175392.4, dated Nov. 29, 2017, 8 pages.
Extended European Search Report for Application No. 17175393.2, dated Dec. 4, 2017, 8 pages.
Extended European Search Report for Application No. 17175394.0, dated Nov. 14, 2017, 8 pages.
Extended European Search Report for Application No. 17175395.7, dated Aug. 10, 2017, 11 pages.
Extended European Search Report for Application No. EP15179440.1, dated Feb. 10, 2016, 6 pages.
Fischer A., et al., "An Introduction to Restricted Boltzmann Machines," Progress in Pattern Recognition, Image Analysis, Computer Vision and Applications, vol. 7441, 2012, pp. 14-36.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins J., et al., "Hierarchical Temporal Memory Concepts, Theory, and Terminology," Numenta Inc., 2006, 19 pages.
Hawkins J., et al., "Why Neurons Have Thousands of Synapses, A Theory of Sequence Memory in Neocortex," Frontiers in Neural Circuits, vol. 10, Article 23, Mar. 2016, 13 pages.
Hawkins J, "On Intelligence," How a New Understanding of the Brain Will Lead to the Creation of Truly Intelligent Machines, 2004, Times Books, Jul. 14, 2005, 174 pages.
International Preliminary Report on Patentability for Application No. PCT/EP2015/069670, dated Mar. 16, 2017, 7 pages.
International Preliminary Report on Patentability for Application No. PCT/EP2015/069673, dated Mar. 16, 2017, 9 pages.
International Preliminary Report on Patentability for Application No. PCT/EP2016/052865, dated Aug. 24, 2017, 9 pages.
International Preliminary Report on Patentability for Application No. PCT/EP2016/067308, dated Feb. 15, 2018, 7 pages.
International Preliminary Report on Patentability for Application No. PCT/EP2016/067309, dated Feb. 15, 2018, 7 pages.
International Preliminary Report on Patentability for Application No. PCT/EP2016/067310, dated Feb. 15, 2018, 8 pages.
International Search Report and Written Opinion for Application No. PCT/EP2018/061405, dated Jun. 20, 2018, 12 pages.
International Search Report and Written Opinion for Application No. PCT/EP2018/061406, dated Jun. 20, 2018, 13 pages.
International Preliminary Report on Patentability, Application No. PCT/EP2018/057686, dated Oct. 1, 2019, 7 pages.
International Preliminary Reporton Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Reporton Patentability for Application No. PCT/EP2017/055091, dated Oct. 11, 2018, 9 pages.
International Preliminary Report on Patentability for Application No. PCT/EP2018/057674, dated Oct. 10, 2019, 8 pages.
International Preliminary Report on Patentability for Application No. PCT/EP2018/057685, dated Oct. 10, 2019, 9 pages.
International Preliminary Report on Patentability for Application No. PCT/EP2018/057686, dated Oct. 10, 2019, 8 pages.
International Preliminary Report on Patentability for Application No. PCT/EP2018/061405, dated Nov. 21, 2019, 7 pages.
International Preliminary Report on Patentability for Application No. PCT/EP2018/061406, dated Nov. 21, 2019, 8 pages.
International Preliminary Report on Patentability for Application No. PCT/EP2018/061407, dated Nov. 21, 2019, 8 pages.
International Preliminary Report on Patentability for Application No. PCT/EP2018/061408, dated Nov. 21, 2019, 10 pages.
International Preliminary Report on Patentability for Application No. PCT/EP2018/065303, dated Dec. 26, 2019, 8 pages.
International Preliminary Report on Patentability for Application No. PCT/EP2018/065233, dated Dec. 26, 2019, 10 pages.
International Preliminary Report on Patentability for Application No. PCT/EP2018/065235, dated Dec. 26, 2019, 8 pages.
International Preliminary Report on Patentability forApplication No. PCT/EP2017/055094, dated Oct. 11, 2018, 8 pages.
International Preliminary Report on Patentability forApplication No. PCT/EP2018/065234, dated Dec. 26, 2019, 8 pages.
International Preliminary Report on Patentability forApplication No. PCT/EP2018/065302, dated Dec. 26, 2019, 7 pages.
International Search Report and Written Opinion forApplication No. PCT/EP2015/069670, dated Nov. 11, 2015, 8 pages.
International Search Report and Written Opinion forApplication No. PCT/EP2015/069673, dated Nov. 12, 2015, 10 pages.
International Search Report and Written Opinion forApplication No. PCT/EP2016/052865, dated Mar. 17, 2016, 11 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055094, dated May 15, 2017, 10 pages.
International Search Report and Written Opinion for Application No. PCT/EP2017/055095, dated Apr. 11, 2017, 10 pages.
International Search Report and Written Opinion for Application No. PCT/EP2018/057674, dated May 2, 2018, 10 pages.
International Search Report and Written Opinion for Application No. PCT/EP2018/057685, dated Jun. 1, 2018, 11 pages.
International Search Report and Written Opinion for Application No. PCT/EP2018/057686, dated Apr. 20, 2018, 10 pages.
International Search Report and Written Opinion for Application No. PCT/EP2018/061261, dated Jun. 20, 2018, 13 pages.
International Search Report and Written Opinion for Application No. PCT/EP2018/061407, dated Jun. 20, 2018, 13 pages.
International Search Report and Written Opinion for Application No. PCT/EP2018/061408, dated Jun. 20, 2018, 15 pages.
International Search Report and Written Opinion for Application No. PCT/EP2018/065233, dated Jul. 10, 2018, 12 pages.
International Search Report and Written Opinion for Application No. PCT/EP2018/065235, dated Sep. 3, 2018, 9 pages.
International Search Report and Written Opinion for Application No. PCT/EP2018/065302, dated Aug. 3, 2018, 8 pages.
International Search Report and Written Opinion for Application No. PCT/EP2018/065303, dated Aug. 6, 2018, 10 pages.
International Search Report and Written Opinion for PCT Application No. PCT/EP2016/067308, dated Sep. 21, 2016, 8 pages.
International Search Report and Written Opinion for Application No. PCT/EP2018/065234, dated Sep. 3, 2018, 9 pages.
International Preliminary Report on Patentabilityfor Application No. PCT/EP2017/055095, dated Oct. 11, 2018, 8 pages.

(56) References Cited

OTHER PUBLICATIONS

Jin, et al., "A Guest-Transparent File Integrity Monitoring Method In Virtualization Environment," Elsevier, 2010, 11 pages.
Jover R.P., et al., "dHSS- Distributed Peer-to-Peer Implementation of the LTE HSS Based on the Bitcoin/Namecoin Architecture," 2016 IEEE International Conference on Communications Workshops (ICC), IEEE, May 23, 2016, pp. 354-359.
Lavin A., et al., "Evaluating Real-Time Anomaly Detection Algorithms—The Numenta Anomaly Benchmark," Retrieved from https://arxiv.org/ftp/arxiv/papers/1510/1510.03336.pdf, Numenta, Inc., Oct. 9, 2015, 8 pages.
Miller A., "The State-of-the-Art of Smart Contracts," FinTech R&D Innovation Conference, Luxemburg, Jan. 19, 2016, 29 pages.
Milton L., et al., N-Gram-Based User Behavioral Model for Continuous User Authentication, The Eighth International Conference on Emerging Security Information, Systems and Technologies, 2014, 7 pages.
Noting of Loss of Rights Pursuant to Rule 112(1) EPC For 18728428.6, dated Aug. 21, 2020, 1 page.
Numenta, "Biological and Machine Intelligence (BAMI), A living book that documents Hierarchical Temporal Memory (HTM)," Mar. 8, 2017, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," Numenta, retrieved from https://numenta.com/assets/pdf/biological-and-machine-intelligence/BaMISDR.pdf and accessed on Mar. 29, 2017, retrieved on Mar. 28, 2018, 15 pages.
Olshausen B.A., et al., "Sparse Coding with an Overcomplete Basis Set: A Strategy Employed by VI?," Pergamon, vol. 37, No. 23, 1997, pp. 3311-3325.
Patel H, "A block chain based decentralized exchange," International Association for Cryptologic Research, XP061017563, Dec. 18, 2014, vol. 20141225:065012, 9 pages.
Plohmann D., et al., "Case study of the Miner Botnet," 4th International Conference on Cyber Conflict, Jun. 5, 2012, pp. 345-360.
Purdy S., "Encoding Data for HTM Systems," Retrieved from https://arxiv.org/ftp/arxiv/papers/1602/1602.05925.pdf, Numenta, Inc., Feb. 2016, 11 pages.
Rosenfeld M., "Overview of Colored Coins," https:1/bravenewcoin.com/assets/Whitepapers/Overview-of-Colored-Coins.pdf, Dec. 4, 2012, 13 pages.
Sanda T., et al., "Proposal of New Authentication Method In Wi-Fi Access Using Bitcoin 2.0," 2016 IEEE 5th Global Conference on Consumer Electronics, IEEE, Oct. 11, 2016, pp. 1-5.
Search Report dated Nov. 8, 2017 for Great Britain Application No. GB1707381.8, 7 pages.
Search Report under Section 17 for Great Britain Application No. 1709276.8, dated May 8, 2018, 4 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Sood A.K., et al., "An Empirical Study of HTTP-based Financial Botnets," IEEE Transactions on Dependable and Secure Computing, vol. 13 (2), Mar./Apr. 2016, pp. 236-251.
Taylor M., "Sparse Distributed Representations," Numenta, 2017, 3 pages.
Thorpe S.J., "Spike Arrival Times: A Highly Efficient Coding Scheme for Neural Networks," Parallel Processing in Neural Systems and Computers, 1990, pp. 91-94.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2012, Advances in Neural Information Processing Systems, 2015, 10 pages.
"Who Will Protect Users From Ethereum Based Malware? : Ethereum," Mar. 28, 2016, Retrieved from https://www.reddit.com/r/ethereum/comments/4ccfaa/who_will_protect_users_from_ethereum_based_malware/?st=itbp2q49&sh=d8cc4355 on Nov. 13, 2018, 3 pages.
Wikipedia, "Blockchain (database)—Wikipedia," Nov. 29, 2015, retrieved from https://en.wikipedia.org/w/index.php?title=Block_chain_(database)&oldid=692921608 on Nov. 13, 2018, pp. 1-5.
Wood G., "Ethereum: A Secure Decentralised Generalized Transaction Ledger," EIP-150 Revision, Jun. 4, 2014, pp. 1-32.
Written Opinion for Application No. PCT/EP2018/057686, dated Oct. 4, 2018, 6 pages.
Wu J., et al., "Hierarchical Temporal Memory Method for Time-Series-Based Anomaly Detection," 2016, IEEE, 16th International Conference Data Mining Workshops, XP033055893, Dec. 2016, pp. 1167-1172.
Zambonelli, et al., "Agent-Oriented Software Engineering for Internet Applications," Coordination of Internet Agents: Models, Technologies, and Applications, Chapter-13, Springer, 2000, 21 pages.
Zupan B., et al., "Machine Learning by Function Decomposition," ICML 1997, Retrieved from http://citeseerx.ist.psu.edu/viewdoc/download?doi=10.1.1.29.4455&rep=rep1&type=pdf on Oct. 17, 2017, 9 pages.
Application and File History for U.S. Appl. No. 15/939,650, filed Mar. 29, 2018, Inventor(s): Daniel et al.

* cited by examiner

US 11,341,237 B2

ANOMALY DETECTION FOR COMPUTER SYSTEMS

CROSS-REFERENCE TO RELATED APPLICATIONS

The present application is a National Phase entry of PCT Application No. PCT/EP2018/057685, filed Mar. 26, 2018, which claims priority from European Patent Application No. 17164005.5 filed Mar. 30, 2017, each of which is fully incorporated herein by reference.

TECHNICAL FIELD

The present disclosure relates to the detection of anomalous operation of a computer system. In particular, it relates to the detection of non-compliance based on anomalies.

BACKGROUND

Computer systems are susceptible to misuse, hijack or malicious software and/or access that can lead to harm including: data loss; the execution or perpetuation of malicious software; data theft; misappropriation of information or computing resources; interruption, denial or degradation of service; or other harms as will be familiar to those skilled in the art.

Techniques to detect and remediate inappropriate, unauthorized or undesirable use of a computer system are focused on recognizing such use and reacting accordingly. Such techniques therefore require constant monitoring of a computer system in use to spot problematic operation or use based on rules. While this approach may be effective, it is very resource intensive and cumbersome to apply to an entire computer system or a set of disparate computer systems. For example, where two disparate systems are required to comply with a single set of rules it can be necessary to implement multiple different monitoring mechanisms, one of each system, to accommodate technical differences therebetween.

SUMMARY

It would be advantageous to monitor the compliance of computer systems with compliance rules without the aforementioned disadvantages.

The present disclosure accordingly provides, a computer implemented method to detect a computer system in execution operating in a manner that is not compliant with a definition of a set of compliant operations, the method comprising: receiving a first set of records for the computer system, each record detailing an occurrence in the computer system during a first predetermined time period; generating a sparse distributed representation of the first set of records to form a training set for a hierarchical temporal memory (HTM); training the HTM based on the training set in order that the trained HTM provides a model of the operation of the computer system during the predetermined time period; selecting at least a subset of operations in the set of compliant operations and causing the invocation of each operation of the subset in the computer system over a second predetermined time period to generate a second set of records of occurrences in the computer system; generating a sparse distributed representation of the second set of records to form an input set for the trained HTM; executing the trained HTM based on the input set to determine a degree of recognition of the records of the input set; and responsive to a determination that a degree of recognition of one or more records of the input set is below a threshold degree, identifying the operation of the computer system as non-compliant.

In some embodiments the method further comprises: in response to an identification that the operation of the computer system is non-compliant, implementing a protective measure to protect against a malicious operation of the computer system.

In some embodiments the protective measure includes one or more of: causing a cessation of operation of the computer system; generating an event indicating the non-compliance of the computer system; suspending operation of the computer system; executing one or more protective and/or remedial software components in the computer system.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION OF THE DRAWINGS

Figure 1:
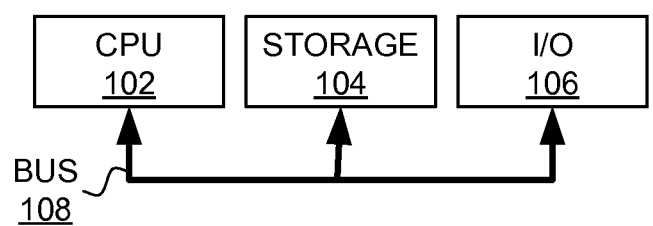
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
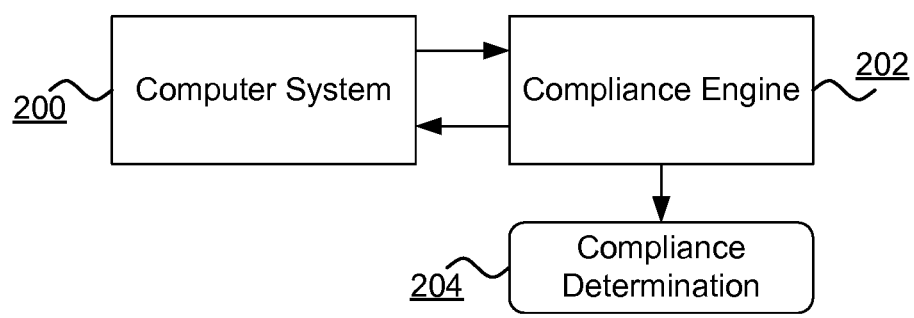
FIG. 2 is a component diagram of an exemplary arrangement of a system in accordance with embodiments of the present disclosure.

FIG. 2 is a component diagram of an exemplary arrangement of a system in accordance with embodiments of the present disclosure. A computer system 200 is provided as a physical, virtual or combination computer system for which a state of operational compliance is to be determined. A determination of a state of operational compliance for the computer system 200 includes determining if the computer system 200 is compliant with rules of operation defined for the computer system. Such rules can include, inter alia: a definition of software, services, protocols and/or functions that can be used and/or executed by the computer system 200; a definition of a volume, quantity, extent or proportion of one or more resources that can be reserved, employed, accessed or otherwise utilized by the computer system 200; temporal restrictions on operation of all or part of the computer system 200; user access controls to all or part of the computer system 200; network communication that is permitted and/or precluded including definitions of rules relating to network endpoints, protocols, services, appliances and the like that may or may not be employed by or used with the computer system; a definition of data that can or cannot be stored in, with or by the computer system; a definition of one or more technical standards that must be employed or must not be employed by the computer system including standard protocols, encryption, access control mechanisms, software and/or data verification, resource consumption, standard security facilities including network security, antivirus, intrusion detection and the like, and other such standards as will be apparent to those skilled in the art; and other compliance requirements.

It will be appreciated that the computer system 200 can be a complete computer system such as illustrated in FIG. 1 or can be a part of a computer system 200 such as a software component or application executing on or with a computer system, a service provided at least in part by a computer system, or a network of multiple computer systems in communication.

FIG. 2 further includes a compliance engine 202 arranged to access the computer system 200 to determine a state of operational compliance of the computer system 200. The compliance engine 202 thus generates a compliance determination 204 for the computer system 200. Notably, the compliance determination 204 will relate to operation of the computer system 200 for a defined period of time (since a compliant computer system could become subsequently non-compliant). Accordingly, in some embodiments the compliance engine 202 operates on a continuous basis to determine a state of operational compliance for the computer system 200.

Figure 3:
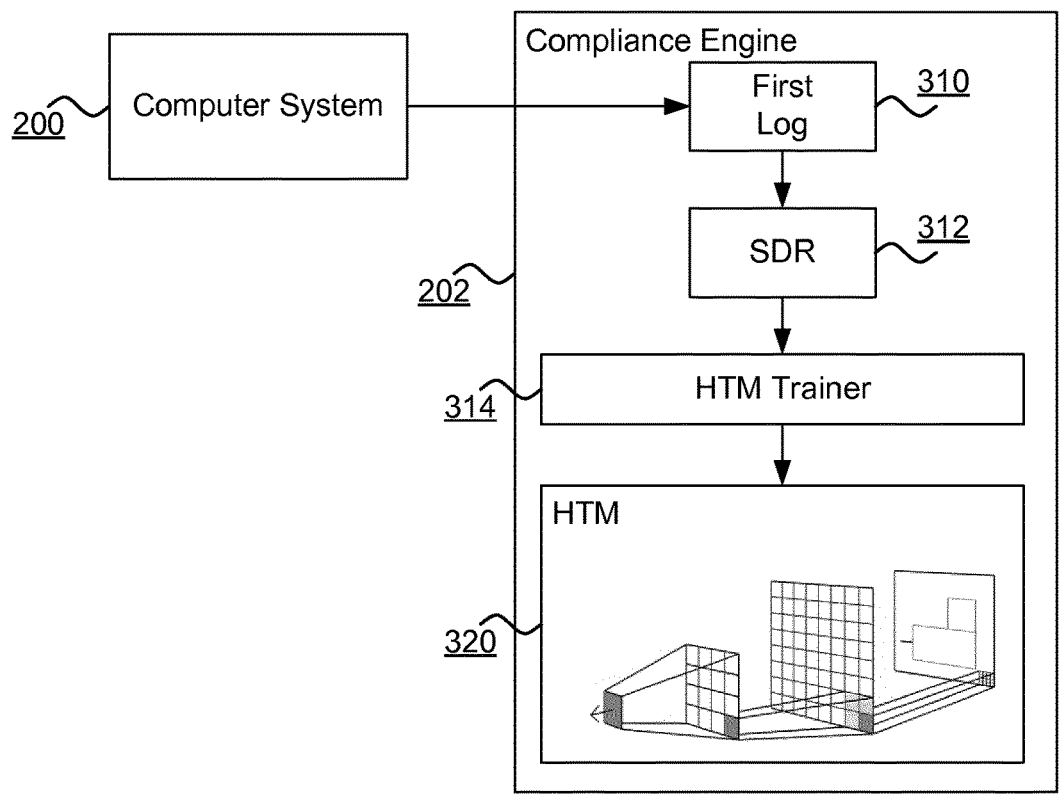
FIG. 3 is a component diagram of an exemplary arrangement of a compliance engine configured to train a hierarchical temporal memory in accordance with embodiments of the present disclosure.

FIG. 3 is a component diagram of an exemplary arrangement of a compliance engine 202 configured to train a hierarchical temporal memory (HTM) 320 in accordance with embodiments of the present disclosure. The compliance engine 202 receives a first log 310 from the computer system 200. The first log 310 is a set of records for the computer system 200 where each record details an occurrence in the computer system during a defined time period while the computer system 200 is in operational use. Operational use refers to a normal use of the computer system 200 by users, systems and the like. For example, the log 310 can include records relating to: user access; data storage; network communication; systems configuration; software execution; errors; warnings; configuration changes; software events; and other records of occurrences in the computer system 200 as will be apparent to those skilled in the art.

The compliance engine 202 uses the records in the first log 310 to constitute training data inputs for training a HTM 320. The HTM 320 is a machine learning construct based on principles first described by Jeff Hawkins in "On Intelligence" (2004, Times Books, ISBN 0-8050-7456-2) and described in detail by Numenta in "Hierarchical Temporal Memory including HTM Cortical Learning Algorithms" (Numenta, 12 Sep. 2011). The principles of, implementation of and operation of HTM 320 are beyond the scope of this description and are nonetheless available to the skilled person through existing publications including the papers and books below, each and/or all of which are usable by a skilled person to implement the HTM 320 and other associated features for embodiments of the present disclosure:

"Biological and Machine Intelligence (BAMI)—A living book that documents Hierarchical Temporal Memory (HTM)" (Numenta, Inc., Mar. 8, 2017) (retrieved Mar. 29, 2017) available from www.numenta.com "Porting HTM Models to the Heidelberg Neuromorphic Computing Platform" (Billaudelle, S. & Ahmad, S., May 2015) available from Cornell University Library (citation arXiv:1505.02142) and www.arxiv.org "Encoding Data for HTM Systems" (Purdy, S., February 2016) available from Cornell University Library (citation arXiv:1602.05925) and www.arxiv.org "Properties of Sparse Distributed Representations and their Application To Hierarchical Temporal Memory" (Ahmad, S. & Hawkins, J., March 2015) available from Cornell University Library (citation arXiv:1503.07469) and www.arxiv.org "How Do Neurons Operate on Sparse Distributed Representations? A Mathematical Theory of Sparsity, Neurons and Active Dendrites" (Ahmad, S. & Hawkins, J., January 2016) available from Cornell University Library (citation arXiv:1601.00720) and www.arxiv.org "Real-Time Anomaly Detection for Streaming Analytics" (Ahmad, S. & Purdy, S., July 2016) available from Cornell University Library (citation arXiv:1607.02480) and www.arxiv.org "Evaluating Real-time Anomaly Detection Algorithms—the Numenta Anomaly Benchmark" (Lavin, A. & Ahmad, S., October 2015) available from Cornell University Library (citation arXiv:1510.03336) and www.arxiv.org "The HTM Spatial Pooler: A Neocortical Algorithm for Online Sparse Distributed Coding" (Cui, Y., Ahmad, S. & Hawkins, J., February 2017) available from Cold Spring Harbor Laboratory bioRxiv (citation doi.org/10.1101/085035) and www.biorxiv.org "Continuous Online Sequence Learning with an Unsupervised Neural Network Model" (Cui, Y., Ahmad, S. & Hawkins, K., November 2016) published in Published in Neural Computation (November 2016, Vol 28. No. 11) and available from www.numenta.com "Why Neurons Have Thousands of Synapses, A Theory of Sequence Memory in Neocortex" (Hawkins, J. & Ahmad, S., March 2016) published in Frontiers in Neural Circuits (10 (2016) 1-13, doi:10.3389/fncir.2016.00023) and available from www.numenta.com At a very high level, in one embodiment, the HTM 320 is implementable logically as a hierarchy of functional nodes. The hierarchy of nodes in the HTM 320 is suitable for identifying coincidences in a temporal sequence of input patterns received at an input layer in the hierarchy, with interconnections between the layers permitting such identifications to take place also at each other level in the hierarchy. In addition to an identification of coincidences by nodes in the HTM 320, temporal relationships between coincidences can also be identified. Thus, in a purely exemplary arrangement, a first set of similar patterns occurring before a second set of similar patterns can be resolved to a coincidence (of the first set) with a temporal relationship to a coincidence (of the second set). The coincidences and temporal relations learned at each of many levels in the hierarchical HTM 320 provide for subsequent recognition, by the HTM 320, of a conforming temporal sequence of input patterns and non-conformant sequences. Thus, the HTM 320 can be said to operate in: a learning mode of operation in which coincidences and relationships between coincidences are learned by adaptation of the HTM 320; and an inference mode of operation in which the HTM 320 is executed (by which it is meant that the HTM 320 is applied) to process one or more inputs to determine a degree of recognition of the inputs by the HTM 320 based on what has been learned by the HTM 320. Recognition can be based on a determination, by nodes in the HTM 320, of a set of probabilities that an input belongs to one or more known or recognized coincidences in the trained HTM 320, and probabilities that inputs represent a recognized temporal group of coincidences.

When applied in embodiments of the present disclosure, the HTM 320 has two key features: firstly, the HTM 320 is trained based on the first log 310 to represent a model of the operation of the computer system 200 in operational use; and secondly the HTM 320 can determine whether subsequent data sets are recognizable to the HTM 320 and thus bear similarity to the operation of the computer system 200 in operational use.

While the HTM 320 has been described, by way of overview, structurally here, it will be appreciated that its implementation can be a logical representation or approximation of such a structure including a mathematical implementation employing, for example, linear algebra and/or parallel processing means for implementation.

The HTM 320 is trained by a HTM trainer 314 which is a hardware, software, firmware or combination component adapted to undertake the training of the HTM 320. It will be appreciated, on the basis of the above referenced papers and books, that the HTM 320 can operate on the basis of a sparse distributed representation (SDR) 312 of data. For example, an SDR can be a binary representation of data comprised of multiple bits in which only a small percentage of the bits are active (i.e. binary 1). The bits in these representations have semantic meaning and meanings are distributed across the bits. SDR is described in "Sparse Distributed Representations" (Numenta, available from www.github.com and accessed on 29 Mar. 2017). Further, the principles underlying SDR are also described in "Sparse coding with an overcomplete basis set: A strategy employed by V1?" (Olshausen, B. A., Field, D. J., 1997, Vision Research, 37:3311-3325). Accordingly, the records in the first log 310 are initially encoded to a SDR by a suitable encoder. Notably, the encoder is configured to set bits in a SDR 312 for a record based on a semantic meaning of the bits and thus the encoder is specifically configured to encode each record in to a SDR 312 based on semantic meaning of some aspect of the record including, for example, one or more of: a content of the record; characteristics of the record such as its length, origin, when it was received, how it was created, what created it etc.; what the record means, what it indicates, what consequence may ensue as a result of an occurrence recorded by the record etc.; and other aspects as will be apparent to those skilled in the art.

Thus, in use, the compliance engine 202 trains the HTM 320 using SDR representation 312 of records received in the first log 310 for the computer system 200 in operational use. Accordingly, following training, the HTM 320 can be said to constitute a model or record of the operation of the computer system 200 during the time period for which the first log 310 was received. This model is subsequently used to detect an anomalous operation of the computer system 200 vis a vis a set of compliant operations as will be described with respect to FIG. 4.

Figure 4:
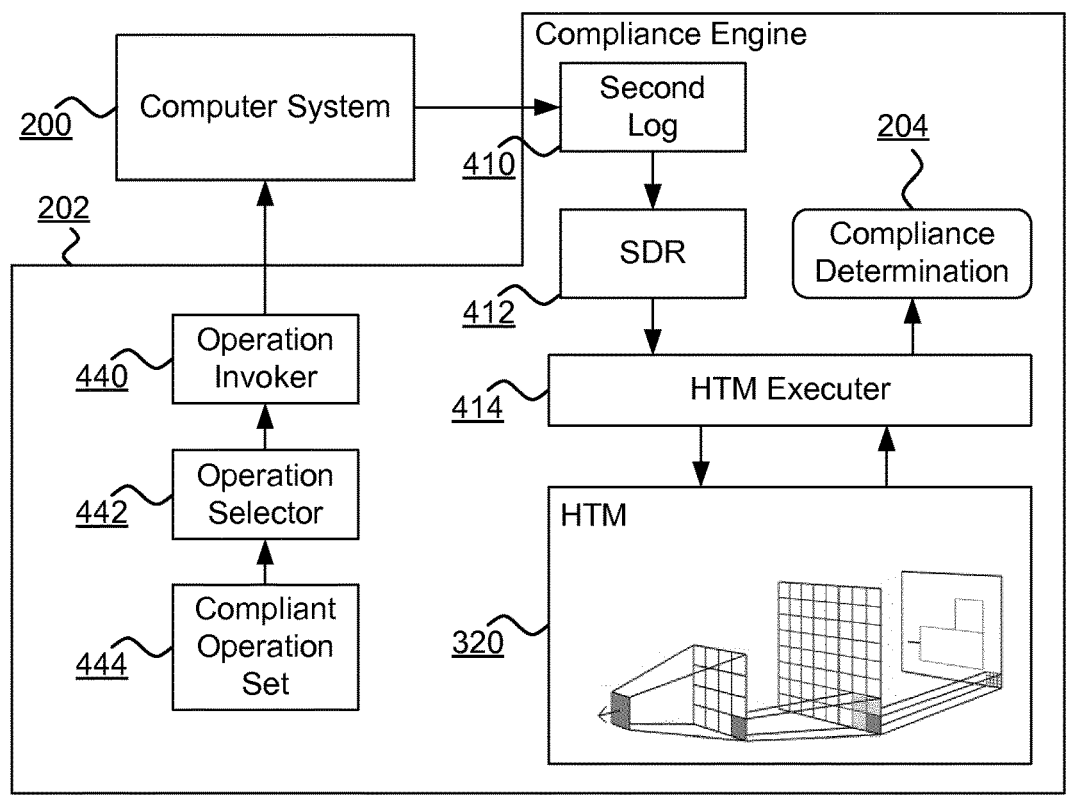
FIG. 4 is a component diagram of an exemplary arrangement of a compliance engine configured to determine compliance of a computer system with operations in a compliant operation set in accordance with embodiments of the present disclosure.

FIG. 4 is a component diagram of an exemplary arrangement of a compliance engine 202 configured to determine compliance of a computer system 200 with operations in a compliant operation set 444 in accordance with embodiments of the present disclosure. The compliant operation set 444 is a set of operations that can be invoked, caused to be invoked or effected, on the computer system 200. For example, the operations can be: user operations such as a user access to a system, resource, component or the like of computer system 200; a configuration operation such as a change to a configuration of a software, hardware, firmware, access control, network, storage, processing, application or other resource of the computer system 200; a network operation such as a sending or receiving of network communication; a software, service, function or resource installation, activation, deinstallation or deactivation; a change to a volume, quantity or amount of one or more resources; a storage, retrieval or transformation of information in or by the computer system 200; or other operations as will be apparent to those skilled in the art. Notably, the operations in the compliant operation set 444 are operations that specifically comply with any compliance requirements for the computer system 200. In one embodiment, the compliant operation set 444 includes operations covering, in combination, substantially all aspects of the computer system 200 for which compliance requirements are defined. At least some subset of the operations in the compliant operation set 444 is selected by an operation selector 442. Such a selection can be random, defined by a rule, schedule or may involve the selection of operations from each of a plurality of aspects of operation of the computer system 200. Once selected, an operation invoker 440 triggers, causes or effects an invocation of each operation by the computer system 200. Such invocation can be effected by the invoker 440 by way of an administrative interface to the computer system 200 such as a privileged access arrangement by the invoker 440. Thus, the invoker 440 causes operations from the compliant operation set 444 to be invoked by the computer system 200.

The invocation of the compliant operations by the computer system 200 will generate records as a second log 410 corresponding to log, trace, event or other information relating to the operation of the computer system 200 when undertaking the operations invoked by the invoker 440. Thus, the second log 410 reflects the operation of the computer system 200 undertaking compliant operations. Notably, the invocation and undertaking of compliant operations by the computer system 200 invoked by the invoker 440 can occur at the same time as the computer system 200 continues with its normal operation such that records reflecting the operational use of the computer system 200 may be included in the second log 410 along with records arising from the compliant operations.

Subsequently, an SDR 412 of the records of the second log is generated by an encoder substantially as previously described with respect to the first log 310. A HTM executer 414 then executes the HTM 320 (now trained by way of the arrangement of FIG. 3) in an inference or recognition mode of operation. In this mode of operation, the HTM 320 determines a degree of recognition of each SDR data item input to it based on its learned model of the operational use of the computer system 200. Based on this degree of recognition the HTM 320 also identifies anomalies as SDR inputs that are not recognized by the trained HTM 320.

The HTM 320, modeling the computer system 200 in operational use, will indicate a strong degree of recognition of SDR for records of the second log 410 arising from compliant operations invoked in the computer system 200 if the computer system 200 in operational use is compliant. If, however, the computer system 200 in operational use is non-compliant then the model of the computer system 200 constituted by the trained HTM 320 is a model of a non-compliant system. Accordingly, in such circumstances, the SDR of records from the second log 410 arising from the invocation of compliant operations will not be recognized, or will be less significantly recognized, by the HTM 320. Indeed such compliant operations will be identified by the HTM 320 as anomalies because they appear anomalous to the learned operational use of the computer system 200 which is non-compliant. That is to say that a degree of recognition of compliant operations by the HTM 320 trained based on a non-compliant computer system 200 will be lower than a degree of recognition where the HTM 320 is trained based on a compliant computer system 200. Thus, according to the arrangement in embodiments of the present disclosure, execution of the HTM 320 to recognize (or not) SDR 412 from the second log 410 serves to identify if the computer system 200 in operational use is compliant. Accordingly, a compliance determination 204 can be made by the compliance engine.

Figure 5:
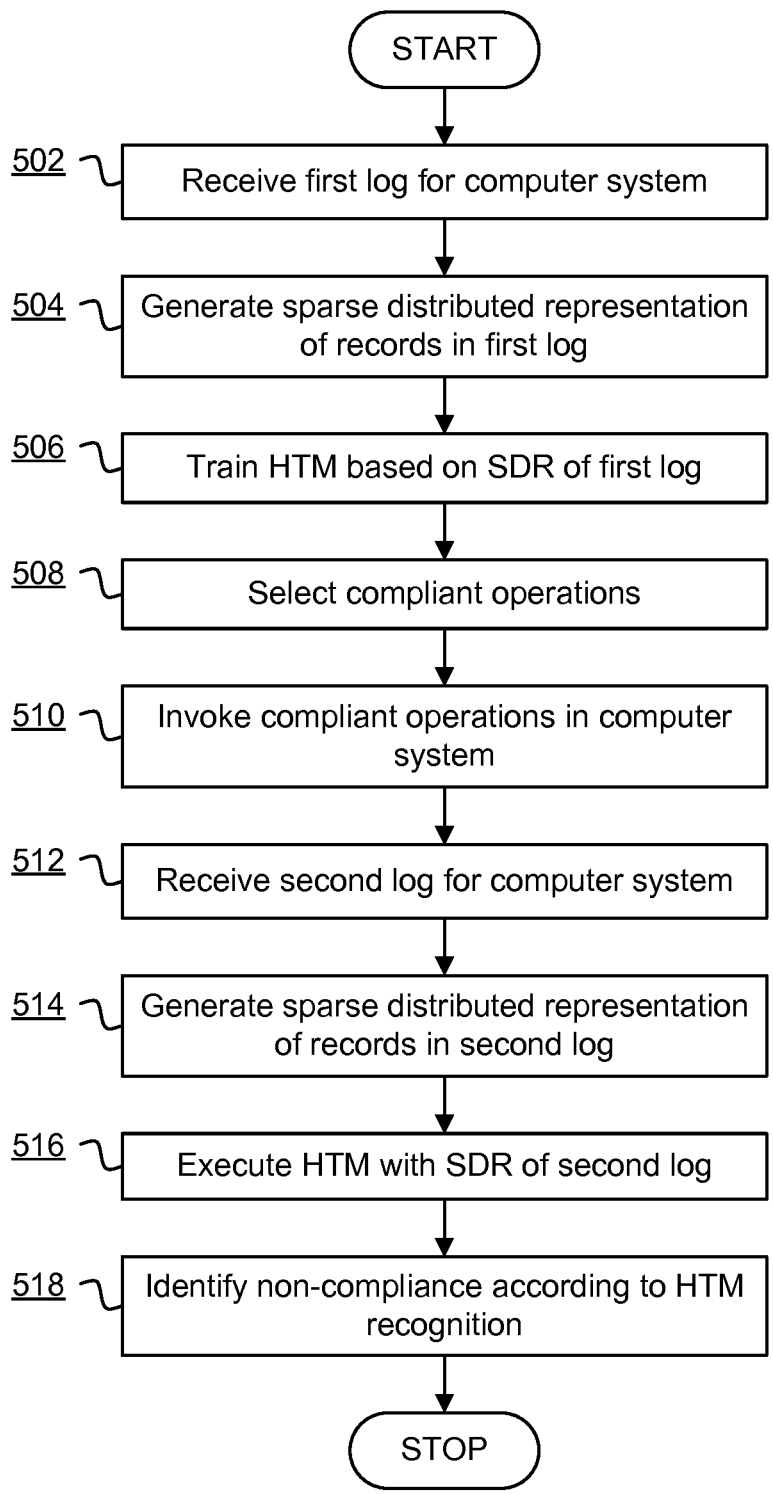
FIG. 5 is a flowchart of a method to detect a computer system in execution operating in a manner that is not compliant with a definition of a set of compliant operations in accordance with embodiments of the present disclosure.

FIG. 5 is a flowchart of a method to detect a computer system 200 in execution operating in a manner that is not compliant with a definition of a set of compliant operations 444 in accordance with embodiments of the present disclosure. Initially, at 502, the compliance engine 202 receives a first log 310 for the operation of the computer system 200 over a predetermined time period in an operational use. At 504 a SDR 314 of the records in the first log 310 is generated, such as by an encoder. At 506 the HTM 320 is trained based on the SDR 314. At 508, compliant operations are selected by the selector 442 from a compliant operation set 444. At 510 the operation invoker 440 invokes the selected compliant operations in the computer system 200 to generate a second log 410 of records. At 512 the compliance engine 202 receives the second log 410 and encodes the records of the second log 410 into a SDR 412 at 514. At 516 the HTM 320 is executed with the SDR 412 of the second log 410 and non-compliance is determined at 518 based on a degree of recognition of the HTM 320 of the SDR 412 of the second log.

Where the computer system 200 is determined to operate in non-compliance with requirements, responsive action can be taken. For example, such action can include protective measures to protect against a malicious operation of the computer system. In some embodiments, protective measures can include, for example: causing a cessation of operation of the computer system 200; generating an event indicating the non-compliance of the computer system 200; suspending operation of the computer system 200; executing one or more protective and/or remedial software components in the computer system. For example: a malware scanner could be invoked; a review of user access control and logs can be undertaken; a firewall can be installed or reconfigured; antivirus software can be invoked or reconfigured; and other such operations as will be apparent to those skilled in the art.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to detect a computer system in execution operating in a manner that is not compliant with a definition of a set of compliant operations, the method comprising:
receiving a first set of records for the computer system, each record detailing an occurrence in the computer system during a first predetermined time period;
generating a sparse distributed representation of the first set of records to form a training set for a hierarchical temporal memory (HTM);
training the HTM based on the training set in order that the trained HTM provides a model of operation of the computer system during the first predetermined time period;
selecting at least a subset of operations in the set of compliant operations and causing the invocation of each operation of the subset of operations in the computer system over a second predetermined time period to generate a second set of records of occurrences in the computer system;
generating a sparse distributed representation of the second set of records to form an input set for the trained HTM;
executing the trained HTM based on the input set to determine a degree of recognition of the records of the input set; and
responsive to a determination that a degree of recognition of one or more records of the input set is below a threshold degree, identifying the operation of the computer system as non-compliant.

2. The method of claim 1, further comprising, in response to an identification that the operation of the computer system is non-compliant, implementing a protective measure to protect against a malicious operation of the computer system.

3. The method of claim 2, wherein the protective measure includes one or more of: causing a cessation of operation of the computer system; generating an event indicating the non-compliance of the computer system; suspending operation of the computer system; or executing one or more protective software components or remedial software components in the computer system.

4. A non-transitory computer-readable storage medium storing a computer program element comprising computer program code to, when loaded into a computer system and executed thereon, cause the computer system to perform the method as claimed in claim 1.

5. A computer system comprising:
    a processor and memory storing computer program code for detecting a computer system in execution operating in a manner that is not compliant with a definition of a set of compliant operations, the method comprising:
        receiving a first set of records for the computer system, each record detailing an occurrence in the computer system during a first predetermined time period;
        generating a sparse distributed representation of the first set of records to form a training set for a hierarchical temporal memory (HTM);
        training the HTM based on the training set in order that the trained HTM provides a model of operation of the computer system during the first predetermined time period;
        selecting at least a subset of operations in the set of compliant operations and causing the invocation of each operation of the subset of operations in the computer system over a second predetermined time period to generate a second set of records of occurrences in the computer system;
        generating a sparse distributed representation of the second set of records to form an input set for the trained HTM;
        executing the trained HTM based on the input set to determine a degree of recognition of the records of the input set; and
        responsive to a determination that a degree of recognition of one or more records of the input set is below a threshold degree, identifying the operation of the computer system as non-compliant.

* * * * *